United States Patent Office 3,639,616
Patented Feb. 1, 1972

3,639,616
PESTICIDAL FORMULATIONS
Irwin A. Lichtman, Oradell, Milton R. Johnson, Somerville, and Leo F. Sekula, Somerset, N.J., and Robert W. Dorn, Modesto, Calif., assignors to Shell Oil Company, New York, N.Y.
No Drawing. Continuation-in-part of application Ser. No. 502,550, Oct. 22, 1965. This application Apr. 20, 1970, Ser. No. 30,250
Int. Cl. A01n 9/22, 17/08
U.S. Cl. 424—300
22 Claims

ABSTRACT OF THE DISCLOSURE

Carbamate pesticides generally insoluble in common agricultural solvents are increased in solubility by the addition of a phenolic compound.

---

This application is a continuation-in-part of Ser. No. 502,550, filed Oct. 22, 1965, now abandoned.

This invention relates to the preparation of pesticidal formulations. In one aspect, this invention relates to increasing the solubility of certain carbamate pesticides in solvents commonly used in preparing pesticidal formulations of those carbamates. In another aspect, this invention relates to the preparation of liquid formulations of normally solid carbamate pesticides that are but sparingly soluble in solvents commonly used in preparing pesticidal formulations of such pesticides. In yet another aspect, this invention relates to the preparation of particulate solid formulations of such carbamate pesticides. In yet another aspect, this invention relates to the preparation of emulsible concentrates of such carbamate pesticides. The novel pesticidal formulations of such carbamate pesticides that are provided form yet another aspect of the invention.

One common way in which a pesticide is applied is to form a dilute solution, suspension or emulsion of the pesticide in water, and apply the resulting formulation by spraying or drenching. Where the pesticide is insoluble in water, or is so slightly soluble in water that the necessary concentration in aqueous solution cannot be attained, it is common practice to formulate the pesticide as a wettable powder that is readily dispersed in water, or as an emulsible concentrate that is readily emulsified with water. The emulsible concentrate ordinarily comprises a solution of the pesticide in a suitable solvent, the solution also containing an appropriate surface-active agent. For economic, as well as technical reasons, it is desirable that the concentrate contain at least one pound, preferably two or more pounds of the pesticide per gallon of the concentrate.

In formulating particulate solid formulations of pesticides—i.e., dust, granules, and the like—it is common practice to impregnate the carrier particles with the pesticide, if liquid, or with a solution of the pesticide in a suitable, ordinarily essentially nonvolatile, solvent. In this case, also, it is desirable that the solution of the pesticide contain at least about one pound and preferably two or more pounds of pesticide per gallon of the solution.

Solvents commonly used in the formulation of the emulsible concentrates, and in the preparation of particulate solid formulations, are liquid hydrocarbons, both aromatic and aliphatic in character. For reasons of effective solvent action and low cost, liquid hydrocarbons such as kerosenes, heavy aromatic naphthas, and other solvents obtained from petroleum, toluenes, xylenes, or mixtures thereof, obtained from petroleum, or by chemical synthesis, are most often used.

The aromatic esters of carbamic acid and of N-aliphatic and N-cycloaliphatic carbamic acids form a class of compounds that is of substantial interest as pesticides, particularly as insecticides, with some species of the class being of interest as herbicides; several species of this class are of commercial stature. In terms of formula, these esters can be represented as follows:

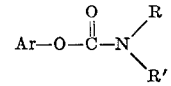

wherein Ar represents the aromatic moiety, R and R' each independently represents hydrogen, straight-chain or branched-chain alkyl or alkenyl of up to 8 carbon atoms; cycloalkyl or cycloalkenyl of up to 10 carbon atoms, preferably with from 5 to 6 carbon atoms in the ring; or R and R' together represent alkylene, alkylene-oxy-alkylene or alkylene-amino-alkylene of up to 8 carbon atoms, R representing one bond and R' representing the other bond thereof, with the proviso that the carbon atom bearing bond R is separated from the carbon atom bearing bond R' by at least two other carbon atoms, and preferably by not more than four other carbon atoms. In these compounds, the aromatic moiety is mononuclear or polynuclear; it may be unsubstituted, or substituted by one or a plurality of hydrocarbon or non-hydrocarbon substituents. Ordinarily, the aroamtic moiety does not contain more than 18 carbon atoms, preferably containing no more than 16 carbon atoms. Suitable hydrocarbon substituents include: phenyl; phenalkyl, alkylphenylalkyl, alkylphenyl of up to 10 carbon atoms; alkyl alkoxy and alkylthio of from 1 to 6 carbon atoms; mono- or dialkyl-amino or aminoalkyl in which each of the alkyl moieties contains from 1 to 6 carbon atoms; halogen, particularly middle halogen—i.e., bromine or chlorine—nitro; N-hetero, such as piperidino, morpholino, pyrrolidino, or the like. When R and/or R' represents alkenyl, the alkenyl preferably is of allyl type, such as allyl, methallyl, crotyl, or the like. The organic groups represented by R and R' preferably are hydrocarbon in character, although the aryl groups can be substituted as indicated herein for the group Ar, and the aliphatic and cycloaliphatic groups can be substituted by middle halogen or hydroxy. Especially preferred are those groups wherein R and R' are hydrogen or alkyl of 1 to 8 carbon atoms.

As a class, these compounds are generally solids at ordinary temperatures, and tend to be insufficiently soluble in the common solvents to form emulsible concentrates containing an economically attractive concentration of the pesticide, or to form solutions containing sufficient pesticide to be useful in the preparation of particulate solid formulations. Thus, for erample, Sevin® (1-naphthyl methylcarbamate) and SD 8530 (3,4,5-trimethylphenyl methylcarbamate) have been found to be insufficiently soluble in common hydrocarbon solvents to permit their economical use in forming the pesticidal formulations. In a similar situation are Baygon (o-isopropoxyphenyl methylcarbamate), Zectran [4-(N,N-dimethylamino)-3,5-xylyl methylcarbamate], Bayer 37344 [4-methylthio)-3,5-xylyl methylcarbamate], Bayer 44646 (4-dimethylamino-3-tolyl methylcarbamate), and others of the carbamates of U.S. Pats. Nos. 2,843,519; 2,854,374, 2,903,478; 2,933,383; 2,992,966; 3,027,298; 3,009,855; 3,062,707; 3,076,741; 3,083,137; 3,084,096; 3,084,098; 3,114,673; 3,130,122 and 3,134,712; South African Pat. 63/959; German Auslegeschrift 1,143,670; Canadian Pat. 555,686; in the article by Kolbezen et al., J. Ag. and Food Chemistry, 2, 864–870 (1954), and in the article by Metcalf et al., J. Ec. Entomolgy, 53, 828 (1962).

Other typical species of this class include:

4-chlorophenyl dimethylcarbamate;
2,4-dichlorophenyl dimethylcarbamate;
2,4-dichlorophenyl methylcarbamate;
2-nitrophenyl dimethylcarbamate;
2,4-dinitrophenyl dimethylcarbamate;
2,4-dichloro-6-nitrophenyl dimethylcarbamate;
2-nitro-4-chlorophenyl dimethylcarbamate;
2-nitrophenylmorpholinyl N-carboxylate;
2,4-dinitrophenyl diisopropylcarbamate;
pentachlorophenyl dimethylcarbamate;
2-methyl-4,6-dinitrophenyl dimethylcarbamate;
4-methoxy-3,5-dimethylphenyl methylcarbamate;
4-chloro-3-methylphenyl dimethylcarbamate;
2,4-dinitro-1-naphthyl dimethylcarbamate;
4-indanyl methylcarbamate;
5-indanyl methylcarbamate;
1-naphthyl carbamate;
1-naphthyl N-cyclopentenyl N-methylcarbamate;
1-naphthyl dimethylcarbamate;
2,4-dichloro-1-naphthyl methylcarbamate;
1-naphthyl N-methyl N-phenylcarbamate;
1-naphthyl-2,2,2-trichloro-1-hydroxyethylcarbamate;
2,5-dimethyl-6-(dimethylaminomethyl)phenyl methylcarbamate;
4-(di-n-butylamino)-3,5-xylyl methylcarbamate;
4-dimethylamino-3-ethyl-5-methylphenyl methylcarbamate;
o-cumenyl methylcarbamate;
3,5-diisopropylphenyl methylcarbamate;
m-isopropylphenyl methylcarbamate;
3-sec-butyl-6-chlorophenyl methylcarbamate;
3-tert-amyl-6-chlorophenyl methylcarbamate;
1-naphthylhexylcarbamate;
o-cresyl dimethylcarbamate.

It now has been found that the solubility of such carbamates in the solvents commonly used in preparation of pesticidal formulations can be increased, in many cases to an economically feasible level, by including with the carbamate a phenolic compound. According to this invention, therefore, carbamates of the aforesaid class are solubilized in common agricultural solvents by including therewith a solubilizing quantity of at least one phenol.

Further, it has been found that in some cases, an admixture of a phenol and a carbamate pesticide is liquid— when intimately admixed, as by grinding together, a solid phenol and a solid carbamate pesticide form a liquid mixture, or a paste, semi-liquid, or mixture of solid and liquid, that is readily liquefied by gentle to moderate heating. Thus, mere mixing with a phenol may render these carbamates into a liquid state that permits their use in application directly, or in preparation of liquid or solid formulations.

Phenols as a class appear to be suitable. Thus, phenol itself is suitable, as are other mononuclear phenols such as alkyl-substituted phenols. Polynuclear phenols, such as alpha- and beta-naphthols, are suitable. Polyphenols, such as hydroquinone, also are suitable. The phenols suitable may be unsubstituted, hydrocarbon-substituted or non-hydrocarbon substituted, for example, the aromatic moiety being one of those described for the aromatic moiety, Ar, in the carbamates to be solubilized. Other specific phenols which may be used to solubilize carbamates according to this invention include catechol, pyrogallol, resorcinol, phloroglucinol, sesamol, 3-phenylisocoumarone, the tocopherols, p-aminophenol, phenol ethers, 2,6-di-tert-butyl phenol, 2,6-di-tert-butyl-alpha-dimethylamino-p-cresols, the cresols, 4,4' - bis(2,6-di-tert-butylphenol), 4,4' - methylene-bis(6-tert-butyl-o-cresol), 2,6 - di-tert-butyl-alpha-methoxy-p-cresol, 2,6 - di-tert-butyl-p-cresol, 2,2' - methylene-bis(4-methyl-6-tert-butylphenol), butylated hydroxyanisoles, propyl gallate, butylated hydroxytoluenes, 2 - hydroxy - 4 - methoxybenzophenone, 3,5 - di-tert-butyl-4-hydroxybenzyl alcohol, p-octylphenol, p-nonylphenol, p-tert-butylphenol, 2,6 - di- tert-butyl-4-methylphenol, 2,6 - diisopropylphenol, 2,6-di-tert-amylphenol, 2,4,6 - trimethylphenol, 2,4,6 - tri-tert-butylphenol, 2,3,4,5 - tetramethylphenol, pentamethylphenol, the xylenols and the like. Mixtures of such phenols are also suitable, as are such mixtures of phenols as those commonly designated as cresylic acids. Preferably phenols are the simple (i.e., unhindered) phenols—the partially hindered and hindered phenols being successively less effective. (The definitions of the three classes of phenols are set on pages 301–202, Kirk-Othmer, "Encyclopedia of Chemical Technology," volume 10, 1st edition, 1953). Other suitable phenols are listed on pages 297–300 of this reference.

Especially preferred among the phenols are those selected from the group consisting of phenol, beta-naphthol, o-, m- and p-cresols, the xylenols and cresylic acids and mixtures thereof.

It has been found that the phenols are stable in the emulsible concentrate and wettable powder formulations, and are compatible with the carbamates and with surface active agents, and other additives commonly included in such formulations.

The choice of a phenol in a given case may depend upon the carbamate pesticide—a phenol may be chosen that will interact with the carbamate to give a liquid mixture. However, the choice of phenol may well depend upon the biological properties of the phenol. Thus, where the formulation is to be employed in preparation of a spray to protect a living plant, as from insects, the phenol should be one that is not phytotoxic, at least at the dosage that would be present in the final spray formulation. On the other hand, if the formulation is to be used for control of unwanted plants, one of the herbicidally active phenols—such as one of the chlorinated phenols—may be chosen. Still another factor may be considered in choosing the phenol: most have bactericidal and/or fungicidal properties, so that the phenols can be selected to impart these properties to the final formulation.

The amount of phenol to be used, relative to the amount of carbamate, will depend upon the particular phenol, the particular carbamate, whether or not a solvent is to be used and if so, its character, and the amount of carbamate to be in liquid solution. For economic reasons, it generally will be found preferable to use the minimum amount of phenol required to assure complete solubility of the carbamate within the temperature range that is contemplated, whether or not a solvent is used. In any particular case, given the desired concentration of a given carbamate to be formulated as a liquid solution, one skilled in the art can readily ascertain the amount of a phenol required to maintain the carbamate in liquid solution and whether a solvent is required or is desirable. Generally speaking, to attain and maintain a liquid solution of a maximum amount of the carbamate will require at least about one-half as much phenol as carbamate on a weight basis—that is, the phenol/carbamate weight ratio must be at least about 0.5. To insure that the carbamate remains in liquid solution at lower temperature, it generally will be found preferable to employ somewhat more than this minimum amount of phenol, so that in most cases it will be found desirable to employ at least about 0.7 part by weight of phenol per part by weight of carbamate. However, it has been found that as the amount of phenol is increased, relative to the amount of carbamate, solubility of the latter increases to a maximum, then decreases, until finally a point is reached where the phenol no longer affects the solubility of the carbamate. Consequently, it will be found undesirable in most cases to employ more than about 3.0 parts by weight of phenol per part by weight of carbamate—and generally will be found desirable to employ no more than about 2.5 parts of phenol per part of carbamate, on the same basis.

It is to be noted that the aforesaid parameters are based upon effecting and maintaining liquid solution of the maximum concentration of the carbamate; if less than the maximum concentration is the goal, then the amount of phenol employed is correspondingly lower.

The phenol can be incorporated into the concentrate formulation in any convenient manner, the particular technique depending to a large extent upon the physical characters of the phenol and carbamate, and mixtures thereof. In some cases, the mixture of phenol and carbamate is itself liquid—as where the phenol is liquid or where the mixture of phenol and carbamate is liquid—or can be readily liquefied, as by gentle to moderate heating to melt the mixture. In some cases, grinding together solid phenol and solid carbamate effects interaction with consequent formation of a paste, semi-liquid or liquid product. In such cases, addition of a solvent may not be necessary, or but a small amount of solvent is used to increase the fluidity of the mixture. In other cases, the phenol can be first added to a solvent, then the carbamate added, or the order of addition to the solvent can be the reverse, or the two materials can be added simultaneously, separately or in admixture.

In all other respects, emulsible concentrates and particulate solid formulations prepared from the phenol-solubilized carbamates are conventional—both as to content and as to manner of manufacture. The solvents, if used, surface active agents, and other adjuvants commonly employed in such pesticidal formulations, are suitable in forming pesticidal formulations according to this invention. In some cases, the surface active agents may have an adverse effect upon the solubility of the carbamate; usually this can be overcome by addition of more of the phenol solubilizer.

Surface active agents which may be used are non-ionic or anionic or mixtures thereof. Typical of such surface active agents are the free acids of complex organic phosphate esters manufactured under the tradenames Gafac RE-610, Gafac RN-510 and Gafac RS-610; dioctyl sodium sulfosuccinate made under the tradename Triton GR-5, Triton GR-7 and Alrowet D-65; complex sulfonates such as those sold under the tradenames Emcol HB or HC; blends of oil soluble sulfonates with polyoxyethylene ethers such as those manufactured under the tradename Emcol N-300B, Emcol N-500B, Emcol N-141B, Atlox 3403 and Atlox 3404 and blends of polyalcohol carboxylic acid esters with oil soluble sulfonates such as Emcol H-77.

The following portion of this specification describes experiments and the results thereof which exemplify and illustrate practice of the invention, and the benefits to be derived therefrom. In these experiments, typical solvents of the kind commonly used in emulsible concentrates and in preparing particulate said formulations were used, typical species of the contemplated class of carbamates were employed, as were typical common readily available phenols. In interpreting the results, the following standards may be applied: considered on the basis of the solvent and pesticide only (or pesticide and phenol only, where no solvent is used), a solution containing about 12.5% by weight of pesticide is about a one-pound-per-gallon formulation; one containing about 25% by weight of the pesticide is about a two-pound-per-gallon formulation; one containing about 37.5% by weight of the pesticide is about a three-pound-per-gallon formulation, and so on. These relations are only approximate, based upon an average specific gravity of common solvents. To accurately assess the results of the experiments would require calculation of the percent by weight/pounds per gallon relationship in each case. Since the difference between the approximate and precise relationships is not great, the approximate relationship has been used, so as to provide basis for quickly estimating the benefit from adding the phenol on the basis of the common solvents generally used, rather than in terms of the particular solvent used in the particular case.

EXAMPLE I

Typical carbamate pesticides were ground together with phenol and the physical properties observed. The following results were obtained.

| Carbamate tested | Mole ratio, phenol/carbamate | Results |
| --- | --- | --- |
| SD 8530 [1] | 2/1 | Clear liquid at 55° C. |
| | 1.4/1 | Clear liquid at 75° C. |
| | 1.1/1 | Clear liquid at 80° C. |
| | 0.7/1 | Clear liquid containing some solid matter at 80° C. |
| Sevin [2] | 2/1 | Clear liquid at 45° C. |
| | 1.33/1 | Clear liquid at 60° C. |
| | 0.9/1 | Clear liquid at 90° C. |

[1] 3,4,5-trimethylphenyl methylcarbamate.
[2] 1-naphthyl N-methylcarbamate.

EXAMPLE II

The solubility of SD 8530 in xylene and other solvents commonly used in making emulsible concentrates has been found to be substantially less than 10% by weight—equivalently, substantially less than one pound per gallon of formulation.

A formulation then was prepared by mixing phenol and SD 8530 in a 1:1 weight ratio (2:1 mole ratio) with xylene or HAN (heavy aromatic naphtha) and an emulsifier to give a final formulation of the composition.

| | Percent by weight |
| --- | --- |
| SD 8530 | 12.5 |
| Phenol | 12.5 |
| Emcol HB emulsifier | 2.5 |
| HAN | 72.5 |

Because emulsible concentrates may be subjected to low temperatures, the formulation was cooled to and held at 0° C. None of the SD 8530 crystallized from the solution. The added phenol thus enabled preparation of a stable approximately one-pound-per-gallon formulation.

When the phenol/SD 8530 ratio was reduced to 0.83, some of the SD 8530 crystallized out of solution at 0° C., although the SD 8530 was fully soluble at higher temperatures.

Mixtures of beta-naphthol and SD 8530 in varying proportions were dissolved in a xylene-emulsifier mixture, as described above. The naphthol/SD 8530 weight ratios were: 1.33; 1.0; 0.83; 0.67; 0.5; and 0.33. When the ratio was between about 0.5 and 1, a stable one-pound-per-gallon formulation was obtained.

EXAMPLE III

Various ratios of Sevin and phenol were examined in a xylene-emulsifier mixture as described in Example II. The carbamate and phenol were mixed with the solvent and emulsifier and the formulation cooled to and held at 0° C. The Sevin-phenol weight ratios used, the intended concentration of Sevin in the formulation present by weight of the formula and the results obtained were as follows:

TABLE I

| Phenol/Sevin weight | Intended Sevin concentration, percent | Remarks |
| --- | --- | --- |
| 1.0 | 12 | Some Sevin crystallized from solution at 0° C. |
| 1.09 | 25 | Traces of Sevin crystallized from solution at 0° C. |
| 1.16 | 25 | Do. |
| 1.25 | 25 | Do. |
| 1.33 | 25 | Do. |
| 1.43 | 25 | Sevin wholly soluble at 0° C. |

In the absence of phenol, Sevin is soluble in xylene to the extent of about 5% by weight, or about one-half-pound-per-gallon. By use of the phenol, emulsible concentrates of up to at least two-pounds-per-gallon are readily prepared.

EXAMPLE IV

SD 8530 two-pound-per-gallon emulsifiable concentrates were prepared by mixing SD 8530 and the phenol in a 1:1 weight ratio with xylene and an emulsifier to give the following formulations:

|  | Percent wt. |
|---|---|
| SD 8530 | 24.5 |
| Phenol | 24.5 |
| Triton GR-5 | 10.2 |
| Xylene | 40.8 |
| SD 8530 | 24.5 |
| o-Cresol | 24.5 |
| Triton GR-5 | 10.0 |
| Xylene | 41.0 |

The SD 8530 was soluble in both formulations at room temperature; however, when cooled to 0° C. some of the SD 8530 crystallized out.

EXAMPLE V

In another series of experiments with SD 8530 as toxicant, a different phenol was used. The phenol in this case was cresylic acid (a commercial mixture of phenols from coal tar, boiling at about 205° C. and above). Further, no emulsifier was included. In all cases, solubility was checked only at room temperature.

In the first four experiments, the amount of toxicant, phenol, and solvent, were selected to provide a toxicant concentration of 20% by weight in the final formulation. The phenol/toxicant ratios in the four cases were, respectively: 3.2; 2.4; 1.6; and 0.8. In all cases, the toxicant completely dissolved. The amount of xylene in the four cases was, respectively: 16%, 32%, 48%, and 64%, by weight.

An attempt then was made to dissolve 27.5 parts of SD 8530 in a mixture of 14.5 parts cresylic acid and 58 parts of xylene; the SD 8530 was only partly soluble.

27.5 parts of SD 8530 then was mixed with 29 parts of cresylic acid and 58 parts of xylene; it was completely dissolved.

EXAMPLE VI

An attempt was made to prepare a 25% by weight solution of Sevin in a heavy aromatic naphtha. Even when the mixture was heated to 130° F., most of the Sevin remained undissolved.

When an equal amount of beta-naphthol was added (substituted for an equal amount of solvent), the Sevin was completely soluble. Although a large part of the Sevin crystallized out of solution when the solution was cooled to 75° C., the warm solution would be quite suitable for preparing a particulate solid formulation of Sevin.

In the foregoing description, emphasis has been placed upon the use of the phenol to further solubilize a sparingly soluble pesticide. The use of the phenol is not limited to such situations, inasmuch as the phenol also effectively increases the solubility of pesticides already moderately soluble in common agricultural solvents.

We claim as our invention:

1. A pesticidal liquid mixture consisting of a carbamic acid ester of the formula

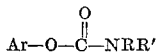

wherein R and R' are each independently hydrogen or alkyl of up to 8 carbon atoms and Ar is a substituted or unsubstituted aromatic mononuclear or polynuclear moiety of up to 18 carbon atoms which when substituted has one or more substituents selected from the group consisting of phenyl; phenalkyl, alkylphenylalkyl, and alkylphenyl of up to 10 carbon atoms; alkyloxy and alkylthio from 1 to 6 carbon atoms; mono- or dialkylamino or aminoalkyl in which each alkyl moiety contains from 1–6 carbon atoms; chlorine, bromine, nitro, piperidino, morpholino and pyrrolidino; and a phenol in an amount sufficient to maintain said carbamic acid ester in a liquid state, said phenol being selected from the group consisting of phenol, catechol, hydroquinone, pyrogallol, resorcinol, phloroglucinol, sesamol, 3-phenylisocoumarone, the tocopherols, p-aminophenol, phenol ethers, 2,6-di-tert-butylphenol, 2,6 - di-tert-butyl-alpha-dimethylamino-p-cresols, ortho, meta and para cresol, 4,4'-bis(2,6-di-tert-butylphenol), 4,4-methylene-bis(6-tert-butyl-o-cresol), 2,6-di-tert-butyl-alpha-methoxy-p-cresol, 2,6 - di-tert-butyl-p-cresol, 2,2'-methylenebis(4-methyl-6-tert-butylphenol), butylated hydroxy-anisole, propyl gallate, butylated hydroxytoluene, 2 - hydroxy - 4 - methoxybenzophenone, 3,5 - di - tert-butyl-4-hydroxybenzyl alcohol, p-octylphenol, p-nonylphenol, p-tert-butylphenol, 2,6-di-tert-butyl-4-methylphenol, 2,6-diisopropylphenol, 2,6-di-tert-amylphenol, 2,4,6-trimethylphenol, 2,4,6-tri-tert-butylphenol, 2,3,4,5-tetramethylphenol, pentamethylphenol, the xylenols, beta naphthol and cresylic acid, and mixtures thereof.

2. The liquid mixture of claim 1 wherein the phenol is selected from the group consisting of phenol, beta naphthol, o-, m- and p-cresols, the xylenols, and cresylic acid and mixtures thereof.

3. The liquid mixture of claim 2 wherein the ester is 3,4,5-trimethylphenyl methylcarbamate.

4. The liquid mixture of claim 2 wherein the ester is 1-naphthyl methylcarbamate.

5. The liquid mixture of claim 1 having in addition to said ester and phenol, a particulate solid agricultural carrier in admixture therewith.

6. A pesticidal liquid concentrate of a carbamic acid ester of the formula

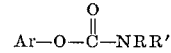

wherein R and R' are each independently hydrogen or alkyl of up to 8 carbon atoms and Ar is a substituted or unsubstituted aromatic mononuclear or polynuclear moiety of up to 18 carbon atoms which when substituted has one or more substituents selected from the group consisting of phenyl; phenalkyl, alkylphenylalkyl, and alkylphenyl of up to 10 carbon atoms; alkyloxy and alkylthio from 1 to 6 carbon atoms; mono- or dialkylamino or aminoalkyl in which each alkyl moiety contains from 1–6 carbon atoms; chlorine, bromine, nitro, piperidino, morpholino and pyrrolidino; comprising a solution of said ester and a phenol selected from the group consisting of phenol, catechol, hydroquinone, pyrogallol, resorcinol, phloroglucinol, sesamol, 3-phenylisocoumarone, the tocopherols, p-aminophenol, phenol ethers, 2,6-di-tert-butylphenol, 2,6 - di-tert-butyl-alpha-dimethylamino-p-cresols, ortho, meta and para cresol, 4,4'-bis(2,6-di-tert-butylphenol), 4,4-methylene-bis(6-tert-butyl-o-cresol), 2,6-di-tert-butyl-alpha-methoxy - p - cresol, 2,6-di-tert-butyl-p-cresol, 2,2' - methylenebis(4 - methyl - 6 - tert-butylphenol), butylated hydroxy-anisol, propyl gallate, butylated hydroxytoluene, 2 - hydroxy - 4 - methoxybenzophenone, 3,5-di-tert-butyl-4-hydroxybenzyl alcohol, p-octylphenol, p-nonylphenol, p-tert-butylphenol, 2,6-di-tert-butyl-4-methylphenol, 2,6-diisopropylphenol, 2,6-di-tert-amylphenol, 2,4,6-trimethylphenol, 2,4,6-tri-tert-butylphenol, 2,3,4,5-tetramethylphenol, pentamethylphenol, the xylenols, beta naphthol and cresylic acid, and mixtures thereof in a liquid hydrocarbon, the amount of said ester dissolved in said liquid hydrocarbon being greater than obtainable in the absence of said phenol under otherwise identical conditions.

7. The concentrate of claim 6 wherein the liquid hydrocarbon is an aromatic liquid hydrocarbon.

8. The concentrate of claim 6 wherein the phenol is selected from the group consisting of phenol, beta naphthol, o-, m- and p-cresol, the xylenols, and cresylic acid and mixtures thereof.

9. The concentrate of claim 8 wherein the ester is 3,4,5-trimethylphenyl methylcarbamate.

10. The concentrate of claim 8 wherein the ester is 1-naphthyl methylcarbamate.

11. The concentrate of claim 9 wherein the liquid hydrocarbon is an aromatic liquid hydrocarbon.

12. The concentrate of claim 10 wherein the liquid hydrocarbon is an aromatic liquid hydrocarbon.

13. The liquid mixture of claim 3 wherein the simple phenol is phenol.

14. The concentrate of claim 4 wherein the simple phenol is phenol.

15. A method for dissolving in a liquid hydrocarbon a pesticidal aromatic ester of a carbamic acid of the formula

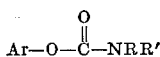

wherein R and R' are each independently hydrogen or alkyl of up to 8 carbon atoms and Ar is a substituted or unsubstituted aromatic mononuclear or polynuclear moiety of up to 18 carbon atoms which when substituted has one or more substituents selected from the group consisting of phenyl; phenalkyl, alkylphenylalkyl, and alkylphenyl of up to 10 carbon atoms; alkyloxy and alkylthio from 1 to 6 carbon atoms; mono- or dialkylamino or aminoalkyl in which each alkyl moiety contains from 1–6 carbon atoms; chlorine, bromine, nitro, piperidino, morpholino and pyrrolidino; said ester being insoluble to sparingly soluble in said liquid hydrocarbon, said method comprising admixing the liquid hydrocarbon, the ester and a sufficient amount of a phenol selected from the group consisting of phenol, catechol, hydroquinone, pyrogallol, resorcinol, phloroglucinol, sesamol, 3-phenylisocoumarone, the tocopherols, p-aminophenol, phenol ethers, 2,6-di-tert-butylphenol, 2,6-di-tert-butyl-alpha-dimethylamino-p-cresols, ortho, meta and para cresol, 4,4'-bis(2,6-di-tert-butylphenol), 4,4-methylene-bis(6-tert-butyl-o-cresol), 2,6-di-tert-butyl-alpha-methoxy-p-cresol, 2,6-di-tert-butyl-p-cresol, 2,2' - methylenebis(4-methyl-6-tert-butylphenol), butylated hydroxy-anisole, propyl gallate, butylated hydroxytoluene, 2-hydroxy-4-methoxybenzophenone, 3,5-di-tert-butyl-4-hydroxybenzyl alcohol, p-octylphenol, p-nonylphenol, p-tert-butylphenol, 2,6-di-tert-butyl-4-methylphenol, 2,6-diisopropylphenol, 2,6-di-tert-amylphenol, 2,4,6-trimethylphenol, 2,4,6-tri-tert-butylphenol, 2,3,4,5-tetramethylphenol, pentamethylphenol, the xylenols, beta naphthol and cresylic acid, and mixtures thereof, to effect a solution of said ester and said phenol in said hydrocarbon.

16. The method of claim 15 wherein the phenol is selected from the group consisting of phenol, beta naphthol and cresylic acid.

17. The method of claim 16 wherein the ester is 1-naphthyl methylcarbamate.

18. The method of claim 16 wherein the ester is 3,4,5-trimethylphenyl methylcarbamate.

19. The pesticidal liquid concentrate of claim 6 containing in addition to said ester, phenol and liquid hydrocarbon a non-ionic or anionic surface active agent.

20. The pesticidal liquid concentrate of claim 8 containing in addition to said ester, phenol and liquid hydrocarbon a non-ionic or anionic surface active agent.

21. The pesticidal liquid concentrate of claim 10 containing in addition to said ester, phenol and liquid hydrocarbon a non-ionic or anionic surface active agent.

22. The pesticidal liquid concentrate of claim 11 containing in addition to said ester, phenol and liquid hydrocarbon a non-ionic or anionic surface active agent.

References Cited
UNITED STATES PATENTS

| | | | |
|---|---|---|---|
| 2,662,841 | 12/1953 | Fike et al. | 252—363.5 |
| 2,991,222 | 7/1961 | Leitner | 252—363.5 |
| 3,130,122 | 4/1964 | Kuderna et al. | 167—30 C |
| 3,215,595 | 11/1965 | Böcker et al. | 167—30 C |
| 3,379,650 | 4/1968 | Beasley et al. | 252—363.5 |

STANLEY J. FRIEDMAN, Primary Examiner

U.S. Cl. X.R.

424—248, 263, 274, 284, 286, 308, 330, 340, 346; 252—363.5